United States Patent
Rachi

(10) Patent No.: US 10,573,428 B2
(45) Date of Patent: Feb. 25, 2020

(54) ELECTRIC WIRE PROTECTION MEMBER, METHOD FOR MANUFACTURING SAME, AND WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Hironobu Rachi, Yokkaichi (JP)

(73) Assignees: AUTONETWORKS TECHNOLOGIES, LTD., Yokkaichi-shi, Mie (JP); SUMITOMO ELECTRIC INDUSTRIES, LTD., Osaka-shi, Osaka (JP); SUMITOMO WIRING SYSTEMS, LTD., Yokkaichi-shi, Mie (JP)

(*) Notice: Subject to any disclaimer, the term of this patent is extended or adjusted under 35 U.S.C. 154(b) by 0 days.

(21) Appl. No.: 16/078,513

(22) PCT Filed: Feb. 9, 2017

(86) PCT No.: PCT/JP2017/004815
§ 371 (c)(1),
(2) Date: Aug. 21, 2018

(87) PCT Pub. No.: WO2017/145785
PCT Pub. Date: Aug. 31, 2017

(65) Prior Publication Data
US 2019/0051430 A1      Feb. 14, 2019

(30) Foreign Application Priority Data
Feb. 25, 2016   (JP) .................. 2016-034433

(51) Int. Cl.
H01B 7/24        (2006.01)
H02G 3/04        (2006.01)
(Continued)

(52) U.S. Cl.
CPC ........... H01B 7/24 (2013.01); B60R 16/0215 (2013.01); F16L 58/10 (2013.01); H01B 3/30 (2013.01);
(Continued)

(58) Field of Classification Search
None
See application file for complete search history.

(56) References Cited

U.S. PATENT DOCUMENTS 4,118,532 A * 10/1978 Homsy .................. A61L 27/16
                                                            428/293.4
4,196,187 A *  4/1980 Dannelly ............... A61K 9/501
                                                            424/482
(Continued)

FOREIGN PATENT DOCUMENTS

JP        2014159522 A      9/2014

OTHER PUBLICATIONS

JP2014159522_Description_Translated. english translation of the JP document (Year: 2014).*
(Continued)

Primary Examiner — Timothy J Thompson
Assistant Examiner — Muhammed Azam
(74) Attorney, Agent, or Firm — Reising Ethington, P.C.

(57) ABSTRACT

An electric wire protection member includes a metal pipe to which processing oil adheres, and a resin coating that covers an outer surface of the metal pipe and has a water contact angle of 55 to 78°. The resin coating may be formed by curing a resin paint that is applied to the outer surface of the metal pipe and has a surface tension of 25 to 32 mN/m. A (Continued)

wire harness can be formed by inserting an electric wire into the metal pipe of the electric wire protection member.

9 Claims, 2 Drawing Sheets

(51) Int. Cl.
*F16L 58/10* (2006.01)
*H02G 1/06* (2006.01)
*B60R 16/02* (2006.01)
*H01B 3/30* (2006.01)
*H01B 7/00* (2006.01)
*C09D 133/06* (2006.01)

(52) U.S. Cl.
CPC ............ *H01B 7/0045* (2013.01); *H02G 1/06* (2013.01); *H02G 3/04* (2013.01); *H02G 3/0481* (2013.01); *C09D 133/06* (2013.01)

(56) References Cited

U.S. PATENT DOCUMENTS

| | | | | |
|---|---|---|---|---|
| 4,668,479 A | * | 5/1987 | Manabe | B05B 7/222 118/715 |
| 4,755,425 A | * | 7/1988 | Huang | C08G 18/0823 428/331 |
| 5,073,404 A | * | 12/1991 | Huang | C08G 18/0823 252/582 |
| 5,910,341 A | * | 6/1999 | Fey | C08J 7/123 257/E21.505 |
| 5,912,436 A | * | 6/1999 | Sanchez | H01B 3/441 174/121 A |
| 5,980,985 A | * | 11/1999 | Kikuchi | B05C 11/08 118/319 |
| 6,136,133 A | * | 10/2000 | Maruyama | B29C 65/521 156/273.5 |
| 6,174,604 B1 | * | 1/2001 | Akita | C03C 25/106 428/375 |
| 9,997,900 B2 | * | 6/2018 | Fukuda | H01R 4/22 |
| 2002/0062698 A1 | * | 5/2002 | Baba | G01L 19/0084 73/754 |
| 2003/0069331 A1 | * | 4/2003 | Teiichi | C08G 59/18 523/176 |
| 2009/0126993 A1 | * | 5/2009 | Nishimura | H01B 3/28 174/72 A |
| 2013/0284487 A1 | | 10/2013 | Izawa et al. | |
| 2015/0179308 A1 | | 6/2015 | Inao et al. | |
| 2016/0042837 A1 | * | 2/2016 | Ranganathan | C09D 127/22 174/113 R |
| 2019/0051430 A1 | * | 2/2019 | Rachi | H01B 3/30 |

OTHER PUBLICATIONS

International Search Report and Written Opinion for Application No. PCT/JP2017/004815 dated Mar. 28, 2017; 4 pages.

* cited by examiner

ELECTRIC WIRE PROTECTION MEMBER, METHOD FOR MANUFACTURING SAME, AND WIRE HARNESS

CROSS REFERENCE TO RELATED APPLICATIONS

This application claims the priority of Japanese patent application JP2016-034433 filed on Feb. 25, 2016, the entire contents of which are incorporated herein.

TECHNICAL FIELD

The present invention relates to an electric wire protection member, a method for manufacturing the electric wire protection member, and a wire harness including the electric wire protection member.

BACKGROUND ART

A wire harness to be arranged in a vehicle such as an automobile includes an electric wire and an electric wire protection member for protecting the electric wire. In some cases, a high-voltage electric wire such as an electric wire for connecting a battery and an engine is inserted into the electric wire protection member, for example.

This type of electric wire protection member includes a metal pipe. The surface of the electric wire protection member is colored a certain color such that the insertion of the high-voltage electric wire can be visually confirmed during the arrangement of the wire harness, the removal of the wire harness, and the like. For example, Patent Documents 1 (JP2014-50267A) and 2 (JP2014-50268A) disclose a technique of forming an identification mark on a portion of the outer surface of the metal pipe body, using a coloring agent such as paint or tape.

A metal pipe to be used in the electric wire protection member is produced through molding such as extrusion molding. Right after the molding, processing oil used during the molding adheres to the surface of the metal pipe. When an attempt is made to form the identification mark while this processing oil remains, there is a risk that the adhesion of the identification mark will decrease due to the processing oil existing between the identification mark and the metal pipe. In general, in order to prevent such problems, the identification mark is formed after the metal pipe is degreased and the processing oil is thus removed from the surface of the metal pipe. Also, in general, in order to improve the adhesion of the identification mark, a primer coat is applied between the identification mark and the metal pipe.

In addition, a technique of forming an identification mark using a material having oily-surface adhesion, such as the photo-curable material disclosed in Patent Document 3 (JP2014-159522A), has also been considered.

SUMMARY

With the technique disclosed in Patent Document 3, the difference between the solubility parameter of the processing oil and the solubility parameter of a chain transfer agent is reduced, thus making it possible to provide oily-surface adhesion to the identification mark. However, since the processing oil adhering to the metal pipe is a mixture of various compounds, it is difficult to accurately calculate the solubility parameter of the processing oil. Therefore, depending on the type of processing oil, there is a risk that the adhesive strength between the identification mark and the metal pipe will decrease and thus the identification mark will easily separate from the surface of the metal pipe.

The present disclosure was achieved in view of the above-described circumstance, and provides an electric wire protection member in which the separation of a resin coating from a metal pipe can be suppressed for a long period of time and that can be manufactured at low cost, a method for manufacturing the electric wire protection member, and a wire harness including the electric wire protection member.

An aspect of the present disclosure is an electric wire protection member including:
a metal pipe to which processing oil adheres, and
a resin coating that covers an outer surface of the metal pipe and has a water contact angle of 55 to 78°.

Another aspect of the present disclosure is a wire harness including:
the electric wire protection member of the above-mentioned aspect; and
an electric wire inserted into the metal pipe of the electric wire protection member.

Yet another aspect of the present disclosure is a method for manufacturing an electric wire protection member, including:
preparing a metal pipe in which processing oil adheres to a surface;
applying resin paint having a surface tension of 25 to 32 mN/m to an outer surface of the metal pipe; and
forming a resin coating by curing the resin paint.

The above-mentioned electric wire protection member includes the above-mentioned resin coating having a water contact angle within the above-mentioned specific range. The resin coating can be formed by curing the resin paint having a surface tension of 25 to 32 mN/m.

The surface tension of the above-mentioned resin paint is smaller than or equal to the surface tension of the above-mentioned processing oil. Applying resin paint having a surface tension that is substantially the same as that of the above-mentioned processing oil to the outer surface of the above-mentioned metal pipe makes it possible to disperse the processing oil in the resin paint. Applying resin paint having a surface tension that is smaller than that of the above-mentioned processing oil to the outer surface of the above-mentioned metal pipe makes it possible to extrude the processing oil onto the outer surface of the resin paint. Therefore, the resin paint can come into close contact with the outer surface of the metal pipe without being blocked by the processing oil.

The above-mentioned resin coating is constituted by a cured product of the above-mentioned resin paint and can thus cover the outer surface of the above-mentioned metal pipe without being blocked by the above-mentioned processing oil. As a result, the separation of the resin coating from the metal pipe can be suppressed for a long period of time.

The above-mentioned electric wire protection member can be produced using the manufacturing method of the above-mentioned aspect. With the above-mentioned manufacturing method, the electric wire protection member can be produced without degreasing the above-mentioned metal pipe or applying a primer coat to the metal pipe. Therefore, the manufacturing cost of the electric wire protection member can be easily reduced.

DESCRIPTION OF EMBODIMENTS

Figure 1:
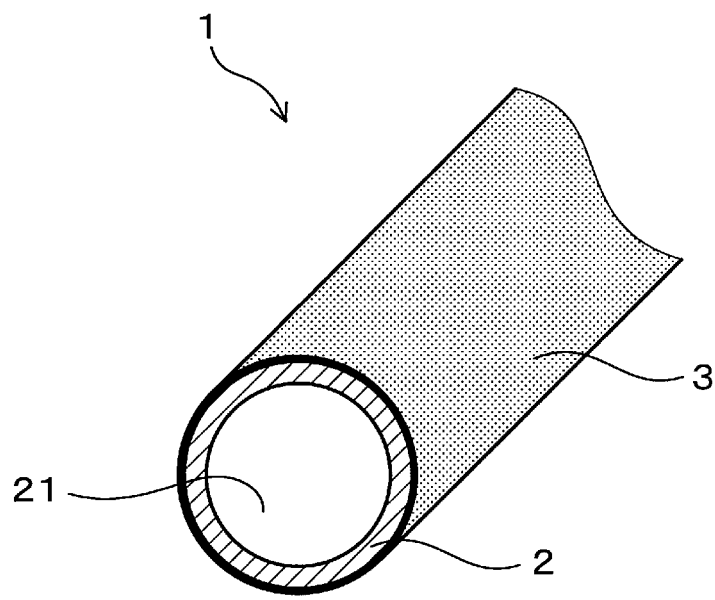
FIG. 1 is a perspective view showing a relevant portion of an electric wire protection member according to a working example.

In the above-mentioned electric wire protection member, the metal pipe is generally made of aluminum or an aluminum alloy from the viewpoint of reducing the weight of a wire harness. Processing oil used during the molding of the metal pipe adheres to the surface of the metal pipe.

Hydrocarbon-based processing oil is often used as the processing oil. The amount of the processing oil adhering to the surface of the metal pipe is preferably $5.0\ \mu g/cm^2$ or less. When the adhesion amount of the processing oil is excessively large, there is a risk that when the resin paint is applied, it will be difficult to disperse the processing oil in the resin paint or extrude the processing oil onto the outer surface of the resin paint. Setting the adhesion amount of the processing oil to be within the above-mentioned specific range makes it easier to prevent these problems. From the same viewpoint, the adhesion amount of the processing oil is more preferably $4.0\ \mu g/cm^2$ or less, even more preferably $3.0\ \mu g/cm^2$ or less, and particularly preferably $2.5\ \mu g/cm^2$ or less.

The processing oil adheres to a portion at which a surface of the metal pipe such as the inner surface of the metal pipe is exposed. In the measurement of the adhesion amount of the processing oil, the processing oil is extracted from the portion at which the surface of the metal pipe is exposed, and then the amount of the extracted processing oil is divided by the area of the portion from which the processing oil was extracted. The adhesion amount of the processing oil can be thus calculated.

The outer surface of the metal pipe is covered with a resin coating having a water contact angle of 55 to 78°. Accordingly, the adhesive strength between the resin coating and the metal pipe can be improved, thus making it possible to suppress the separation of the resin coating for a long period of time.

When the water contact angle of the resin coating exceeds 78°, the surface tension of the resin paint constituting the resin coating is larger than the surface tension of the processing oil. Accordingly, when the resin paint is applied, it is difficult to disperse the processing oil in the resin paint or extrude the processing oil onto the outer surface of the resin paint. As a result, there is a risk that the processing oil will exist between the resin coating and the metal pipe and the adhesive strength of the resin coating will thus decrease. From the viewpoint of preventing such a problem, the water contact angle of the resin coating is set to 78° or less. From the same viewpoint, the water contact angle of the resin coating is preferably 75° or less.

In order to reduce the water contact angle of the resin coating, it is effective to add an additive such as a leveling agent that reduces the surface tension to the resin paint. However, when the content of this type of additive is excessively large, there is a risk that the adhesive strength between the resin coating and the metal pipe will decrease instead. Therefore, from the viewpoint of preventing the decrease in the adhesive strength caused by the additive, the water contact angle of the resin coating is set to 55° or more. From the same viewpoint, the water contact angle of the resin coating is preferably 60° or more, more preferably 63° or more, and even more preferably 65° or more.

The water contact angle can be measured using an ordinary method. For example, when a water droplet is dripped onto the surface of the resin coating, the angle between the interface of the resin coating and the water droplet, and the tangent line at the endpoint of the surface of the water droplet can be taken as the water contact angle.

The above-mentioned resin coating can be formed by applying paint containing a cross-linkable resin to the outer surface of the metal pipe and then cross-linking the cross-linkable resin, for example. Examples of the cross-linkable resin include epoxy resin, polyester resin, acrylic resin, methacrylic resin, epoxy-acrylic resin, urethane-acrylic resin, polyamide resin, and silicone resin.

It is preferable that the resin coating contains one of cross-linked acrylic resin, cross-linked methacrylic resin, cross-linked urethane-acrylic resin, and cross-linked epoxy-acrylic resin. In this case, the glass transition point of the resin coating can be easily increased. Moreover, in this case, the heat resistance of the resin coating can be further improved, and the separation of the resin coating can be made less likely to occur.

It is preferable that the resin coating is made of ultraviolet-curable resin paint. In this case, the paint applied to the metal pipe can be cured quickly. As a result, the productivity of the electric wire protection member can be further improved.

The resin coating may have a color such as an orange color that is different from the ground color of the metal pipe. In this case, it is easy to visually confirm the insertion of a high-voltage electric wire into the above-mentioned electric wire protection member during the arrangement of the wire harness, the removal of the wire harness, and the like, for example.

It is preferable that the resin coating contains a leveling agent in an amount of 0.001 to 0.01 parts by mass. As described above, the leveling agent has a function of reducing the surface tension of the resin paint and thus reducing the water contact angle of the resin coating. Setting the content of the leveling agent to be within the above-mentioned specific range makes it easy to realize the water contact angle within the above-mentioned specific range. As a result, the adhesive strength between the resin coating and the metal pipe can be improved, thus making it possible to suppress the separation of the resin coating for a long period of time.

A known leveling agent such as an alkyl-based leveling agent, a silicone-based leveling agent, or a fluorine-based leveling agent can be used as the leveling agent. From the viewpoint of reducing cost of materials, it is preferable to use the alkyl-based leveling agent, which is relatively inexpensive.

The above-mentioned electric wire protection member can be produced by preparing a metal pipe in which processing oil adheres to the surface, applying resin paint having a surface tension of 25 to 32 mN/m to the outer surface of the metal pipe, and then forming a resin coating through curing the resin paint.

When the surface tension of the resin paint exceeds 32 mN/m, the surface tension of the resin paint is larger than the surface tension of the processing oil. Therefore, in this case, when the resin paint is applied, it is difficult to disperse the processing oil in the resin paint or extrude the processing oil onto the outer surface of the resin paint. As a result, there is a risk that the adhesive strength between the resin coating and the metal pipe will decrease. From the viewpoint of preventing such a problem, the surface tension of the resin paint is set to 32 mN/m or less. From the same viewpoint, the surface tension of the resin paint is preferably 30 mN/m or less.

On the other hand, when the surface tension of the resin paint is less than 25 mN/m, the content of the additive such as a leveling agent that reduces the surface tension is excessively large, and therefore, there is a risk that the adhesive strength between the resin coating and the metal pipe will decrease. Accordingly, from the viewpoint of preventing the decrease in the adhesive strength caused by the additive, the surface tension of the resin paint is set to 25 mN/m or more. From the same viewpoint, the surface tension of the resin paint is preferably 27 mN/m or more.

The wire harness includes the above-mentioned electric wire protection member and an electric wire inserted into the electric wire protection member. The wire harness may include a single electric wire protection member or a plurality of electric wire protection members.

There is no particular limitation on the number of the electric wires inserted into the electric wire protection member, and a single electric wire or a plurality of electric wires can be inserted into the electric wire protection member depending on the application.

The wire harness having the above-mentioned configuration can be favorably used to connect a power conversion device and a battery, or a power conversion device and a motor, for example, in an electric car or a hybrid car.

EXAMPLES

Working Example

A working example of the above-mentioned electric wire protection member will be described with reference to FIG. 1. An electric wire protection member 1 includes a metal pipe 2 into which an electric wire is to be inserted, and a resin coating 3 that covers the outer surface of the metal pipe 2. Processing oil (not shown) adheres to an inner surface 21 of the metal pipe 2. The resin coating 3 has a water contact angle of 55 to 78°.

Although not shown in the diagrams, the electric wire protection member 1 of this working example can be used as a constituent component of a wire harness. The wire harness can be favorably used to connect a power conversion device and a battery, or a power conversion device and a motor, for example, in an electric car or a hybrid car.

The metal pipe 2 of this working example is a cylindrical straight pipe made of an aluminum alloy. It should be noted that the metal pipe 2 may be bent as appropriate depending on the arrangement form of the wire harness.

As shown in FIG. 1, the outer surface of the metal pipe 2 is covered with the resin coating 3. The resin coating 3 has an orange color. Accordingly, the insertion of a high-voltage electric wire into the electric wire protection member 1 can be visually confirmed in a state in which the electric wire protection member 1 is attached to a vehicle.

The electric wire protection member 1 of this working example can be produced using the following method, for example. First, the metal pipe 2 in which processing oil adheres to the outer surface and the inner surface 21 is prepared. Next, resin paint having a surface tension of 25 to 32 mN/m is applied to the outer surface of the metal pipe 2 in the state in which the processing oil adheres to the outer surface. The surface tension of this resin paint is smaller than or equal to the surface tension of the processing oil, and therefore, applying resin paint makes it possible to disperse the processing oil adhering to the outer surface in the resin paint or to extrude the processing oil onto the outer surface of the resin paint.

Then, the resin coating 3 is formed by curing the resin paint. The electric wire protection member 1 can be thus obtained. It should be noted that examples of the resin paint include ultraviolet-curable acrylic resin paint, ultraviolet-curable methacrylic resin paint, and ultraviolet-curable epoxy-acrylic resin paint.

The electric wire protection member 1 of this working example includes the resin coating 3 having a water contact angle within the above-mentioned specific range. The resin coating 3 is constituted by a cured product of resin paint having a surface tension that is smaller than or equal to the surface tension of the processing oil. Therefore, the resin coating 3 can cover the outer surface of the metal pipe 2 without being blocked by the processing oil. As a result, the separation of the resin coating 3 from the metal pipe 2 can be suppressed for a long period of time.

Moreover, when the electric wire protection member is produced, it is not necessary to degrease the metal pipe 2 or apply a primer coat to the metal pipe 2. Therefore, the manufacturing cost of the electric wire protection member 1 can be easily reduced.

Experimental Example

In this experimental example, the adhesion of the resin coatings 3 made of various types of resin paint to the metal pipe 2, and the appearances of the resin coatings 3 were evaluated. The various types of resin paint were produced by mixing a base and a leveling agent at the ratios shown in Tables 1 and 2. The bases and the leveling agent used in the experimental example are as follows.

Base

Base A: Ultraviolet-curable acrylic resin paint ("TB3006D" manufactured by ThreeBond Co., Ltd.)

Base B: Ultraviolet-curable acrylic resin paint ("TB3013Q" manufactured by ThreeBond Co., Ltd.)

Leveling Agent

Leveling agent: Silicone-based leveling agent ("POLYFLOW KL-401" manufactured by Kyoeisha Chemical Co., Ltd.)

The surface tensions of the various types of resin paint were as shown in Tables 1 and 2. It should be noted that the surface tension of the resin paint was measured using a plate method (Wilhelmy method) with an automatic tensiometer ("CBVP-Z" manufactured by Kyowa Interface Science Co., Ltd.).

In this experimental example, specimens of the electric wire protection member 1 were produced in accordance with the following procedure. First, the metal pipes 2 in which hydrocarbon-based processing oil adhered to the surface in an amount of 2.5 µg/cm$^2$ were prepared. The various types of resin paint having the compositions shown in Tables 1 and 2 were sprayed and applied to the outer surfaces of the metal pipes 2 without degreasing the metal pipes 2. Thereafter, the various types of resin paint were irradiated with ultraviolet rays and cured to form the resin coatings 3. Specimens 1 to 10 shown in Tables 1 and 2 were thus produced.

The adhesion amount of the processing oil was measured using the following method. The mass of metal pipe 2 to which the processing oil adhered was measured using a microbalance. Next, the metal pipe 2 was immersed in hexane, and the processing oil was thus removed. Then, the mass of the metal pipe 2 from which the processing oil was removed was measured using the microbalance. The adhesion amount (µg/cm2) of the processing oil was calculated by dividing the difference in the mass (µg) between before and after the immersion in hexane by the surface area (cm$^2$) of the metal pipe.

The obtained specimens 1 to 10 were used to measure the water contact angles, evaluate the appearances, and evaluate the adhesion of the resin coatings 3.

Water Contact Angle

Figure 2:
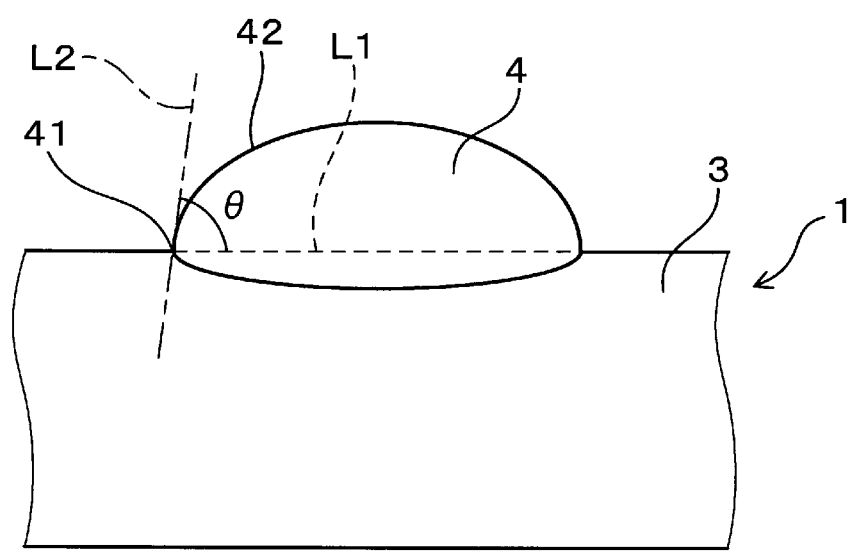
FIG. 2 is an explanatory diagram illustrating a method for measuring a water contact angle according to an experimental example.
Figure 3:
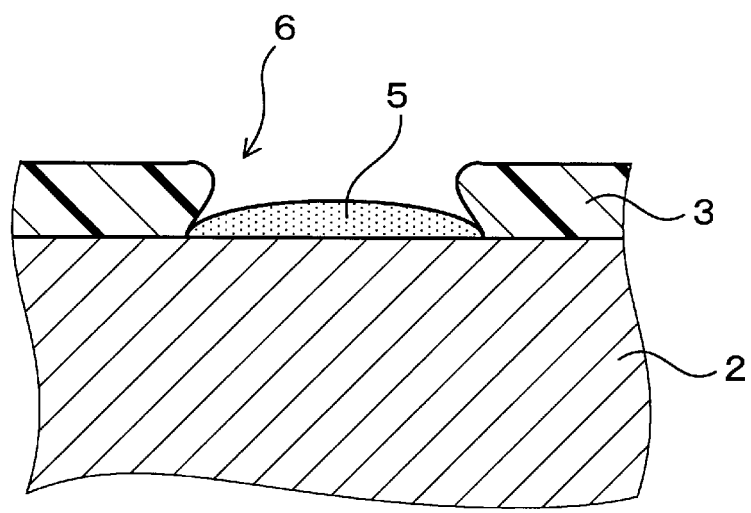
FIG. 3 is a partial cross-sectional view showing an example of a crater-shaped defect formed after coating according to the experimental example.

As shown in FIG. 2, a water droplet 4 on the surface of the resin coating 3 was observed from the lateral side of the specimen. The angle between an interface L1 of the resin coating 3 and the water droplet 4, and a tangent line L2 at an endpoint 41 of a surface 42 of the water droplet 4 was taken as a water contact angle θ. The water contact angles θ of the specimens were as shown in Tables 1 and 2. It should be noted that the water contact angle was measured using an automatic contact angle meter ("DMe-201" manufactured by Kyowa Interface Science Co., Ltd.).

Evaluation of Appearance

The resin coatings 3 of the specimens were visually observed, and whether or not defects were present was evaluated. Based on the results, sign "A" was written in the fields for "Evaluation of appearance" in Tables 1 and 2 for the specimens in which no defects were observed in the resin coating 3, and sign "B" was written in the same fields for the specimens in which defects were observed.

Adhesion of Resin Coating 3

The specimens were immersed in hot water at 100° C. for 30 hours to allow moisture to permeate the resin coatings 3. After 30 hours, a cross-cut adhesion test was performed using the specimens removed from the hot water.

Specifically, the cross-cut adhesion test was performed according to the following procedure. First, the resin coating 3 of each of the specimens was notched in the form of a lattice using a utility knife to produce one hundred square-shaped small pieces of the resin coating 3. Next, adhesive tape (cellophane adhesive tape No. 405 for packaging manufactured by Nichiban Co., Ltd.) was attached to the portion that had been notched in the form of a lattice. Then, the adhesive tape was removed from the specimen, and the number of the small pieces attaching to the adhesive tape was counted. Tables 1 and 2 show the results. It should be noted that the length of one side of each small piece was set to 1 mm.

TABLE 1

|  |  |  | Specimen 1 | Specimen 2 | Specimen 3 | Specimen 4 | Specimen 5 |
|---|---|---|---|---|---|---|---|
| Resin paint | Base A | parts by mass | 100 | 100 | 100 | 100 | 100 |
|  | Base B | parts by mass | — | — | — | — | — |
|  | Leveling agent | parts by mass | — | 0.001 | 0.005 | 0.01 | 0.1 |
|  | Surface tension | mN/m | 34 | 31 | 28 | 25 | 22 |
| Water contact angle |  | ° | 80 | 75 | 70 | 65 | 50 |
| Evaluation of appearance |  | — |  | B | A | A | A | A |
| Evaluation of adhesion |  | number of pieces | 20 | 0 | 0 | 0 | 20 |

TABLE 2

|  |  |  | Specimen 6 | Specimen 7 | Specimen 8 | Specimen 9 | Specimen 10 |
|---|---|---|---|---|---|---|---|
| Resin paint | Base A | parts by mass | — | — | — | — | — |
|  | Base B | parts by mass | 100 | 100 | 100 | 100 | 100 |
|  | Leveling agent | parts by mass | — | 0.001 | 0.005 | 0.01 | 0.1 |
|  | Surface tension | mN/m | 36 | 32 | 29 | 27 | 22 |
| Water contact angle |  | ° | 80 | 75 | 70 | 65 | 50 |
| Evaluation of appearance |  | — | B | A | A | A | A |
| Evaluation of adhesion |  | number of pieces | 20 | 0 | 0 | 0 | 20 |

As shown in Tables 1 and 2, in specimens 2 to 4 and specimens 7 to 9, the surface tension of the resin paint was within the above-mentioned specific range, and the water contact angle of the resin coating 3 was thus within the above-mentioned specific range. Regarding these specimens, the resin coating 3 had no defects, and thus the adhesion between the resin coating 3 and the metal pipe 2 was high.

In specimens 1 and 6, the resin paint having a surface tension higher than that of the processing oil was applied, and therefore, a part of the processing oil remained on the surface of the metal pipe 2. As a result, the adhesion between the resin coating 3 and the metal pipe 2 decreased. A part of the processing oil remaining on the surface of the metal pipe 2 formed an oil droplet 5 as shown in FIG. 5. This caused a defect 6, which is a crater-shaped depression formed in the resin coating 3.

In the specimens 5 and 10, an attempt was made to set the surface tension of the resin paint to be smaller than the above-mentioned specific range, and the addition amount of the leveling agent was thus excessively large. As a result, the adhesion between the resin coating 3 and the metal pipe 2 decreased.

It should be noted that the present invention is not limited to the aspects of Working Example and Experimental Example as described above, and it will be appreciated that various modifications can be made as appropriate without impairing the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electric wire protection member comprising:
   a metal pipe to which processing oil adheres, and
   a resin coating that covers an outer surface of the metal pipe and has a water contact angle of 55 to 78°.

2. The electric wire protection member according to claim 1, wherein the resin coating contains a leveling agent in an amount of 0.001 to 0.01 parts by mass.

3. The electric wire protection member according to claim 1, wherein the resin coating contains one of cross-linked acrylic resin, cross-linked methacrylic resin, cross-linked urethane-acrylic resin, and cross-linked epoxy-acrylic resin.

4. The electric wire protection member according to claim 1, wherein the resin coating is constituted by a cured product of ultraviolet-curable resin paint.

5. The electric wire protection member according to claim 1, wherein the processing oil is hydrocarbon-based processing oil.

6. A wire harness comprising:
   the electric wire protection member according to claim 1; and
   an electric wire inserted into the metal pipe of the electric wire protection member.

7. A method for manufacturing an electric wire protection member, comprising:
   preparing a metal pipe in which processing oil adheres to a surface;
   applying resin paint having a surface tension of 25 to 32 mN/m to an outer surface of the metal pipe; and
   forming a resin coating by curing the resin paint.

8. The method for manufacturing the electric wire protection member according to claim 7, wherein the resin paint contains a leveling agent in an amount of 0.001 to 0.01 parts by mass.

9. The method for manufacturing the electric wire protection member according to claim 7, wherein the processing oil is hydrocarbon-based processing oil.

\* \* \* \* \*